United States Patent [19]
Tsunezune et al.

[11] Patent Number: 6,118,473
[45] Date of Patent: Sep. 12, 2000

[54] CAMERA SYSTEM FOR RECEIVING AND SELECTIVELY TRANSMITTING IMAGES FROM ANOTHER CAMERA CONNECTED BY A CABLE

[75] Inventors: Fujio Tsunezune; Takashi Nakamura; Taku Kihara; Hideaki Murayama; Hitoshi Nakamura, all of Kanagawa, Japan

[73] Assignee: Sony Corporation, Tokyo, Japan

[21] Appl. No.: 08/793,540

[22] PCT Filed: Jun. 21, 1996

[86] PCT No.: PCT/JP96/01729

§ 371 Date: Apr. 28, 1997

§ 102(e) Date: Apr. 28, 1997

[87] PCT Pub. No.: WO97/01239

PCT Pub. Date: Jan. 9, 1997

[30] Foreign Application Priority Data

Jun. 21, 1995 [JP] Japan ..................................... 7-176941

[51] Int. Cl.[7] ............................. H04N 7/14; H04N 5/232; H04N 5/222
[52] U.S. Cl. .............................. 348/17; 348/212; 348/722
[58] Field of Search ..................................... 348/143, 211, 348/212, 213, 17, 722, 705, 13, 14, 15; H04N 7/15

[56] References Cited

U.S. PATENT DOCUMENTS 5,701,581  12/1997  Etoh et al. ................................. 348/17

FOREIGN PATENT DOCUMENTS

| 59-20759 U | 2/1984 | Japan . |
| 61-164380 | 7/1986 | Japan . |
| 64-3266 U | 1/1989 | Japan . |
| 1-212977 | 8/1989 | Japan . |
| 4-75487 | 1/1992 | Japan . |
| 5-14809 | 1/1993 | Japan . |
| 5-145821 | 6/1993 | Japan . |
| 7-154673 | 6/1995 | Japan . |

*Primary Examiner*—Wendy Garber
*Assistant Examiner*—Alicia M. Harrington
*Attorney, Agent, or Firm*—Frommer Lawrence & Haug, LLP.; William S. Frommer; Glenn F. Savit

[57] ABSTRACT

The present invention intends to propose an image pickup apparatus in which a plurality of camera head units can be easily installed at places close to each other. This image pickup apparatus includes a television camera system 10, in which video result of an external device 12 can also be transmitted through a single cable 16 which connects a camera control unit 13 and a camera head unit 15.

54 Claims, 11 Drawing Sheets

CAMERA SYSTEM FOR RECEIVING AND SELECTIVELY TRANSMITTING IMAGES FROM ANOTHER CAMERA CONNECTED BY A CABLE

TECHNICAL FIELD

The present invention relates to an image pickup apparatus, e.g. a television camera system in which image pickup apparatus can be installed with ease by transmitting video results shot by external devices through a single cable which also serves to connect a camera control unit and a camera unit.

BACKGROUND ART

In this kind of television camera system, a camera head unit and a camera control unit have hitherto been connected via a prescribed cable.

Specifically, as shown in FIG. 13, in a television camera system 1, a camera head unit 2, which is fixed to a tripod 3, for example, takes a picture of a desired object by a lens 4 detachably held thereto, and outputs a video signal composed of shot video results to a cable 5. The cable 5 is of a so-called triax cable comprising a single core and shielding wires of two layers disposed coaxially. A video signal is transmitted to a camera control unit 6 through one signal transmission system and a control signal outputted from the camera control unit 6, a video signal of a return image, a power signal or the like are transmitted to the camera head unit 2 through the other signal transmission system.

The camera head unit 2 is operated by power transmitted thereto through the cable 5, and is switched in operation in response to the control signal transmitted thereto through the cable 5. Further, the camera head unit 2 switches an image displayed on a viewfinder 7, which is used to monitor shot video results, thereby to display the return image transmitted through this cable 5, if necessary.

On the other hand, the camera control unit 6 is energized by a commercially-available power supply, and supplies power to the camera head unit 2 through the cable 5. The camera control unit 6 is connected to a remote control panel 8, generates a control signal in response to an operation of operating members disposed on the remote control panel 8, and outputs this control signal through the cable 5 to the camera head unit 2. Further, the camera control unit 6 outputs a video signal, which is inputted thereto through the cable 5, to a monitor 9, thereby making it possible to monitor a shot video result.

Accordingly, in a studio or the like using this kind of television camera, the camera head units 2 are installed at respective shooting places and the camera control units 6 connected to the respective camera head units 2 are installed at one place, thereby making it possible to manage the television camera systems in a centralized manner.

When this kind of television camera is in use, a conventional television camera system requires cables long enough to cover the number of corresponding units in order to connect the camera control units and the camera head units.

In particular, in the outdoors, cables have to be extended in 1 to 2 [km]. If the camera head units are additionally installed under such condition, then cables must be laid along up to such new installation places one more time. Moreover, in the public facilities or the like, there have been previously installed cables in such facilities for use in a variety of purposes. In such shooting spot, it becomes difficult to additionally lay cables used in the television camera system.

Furthermore, in this kind of television camera system, it is frequently observed that a video signal is digitally transmitted by using an optical-fiber cable. When such an optical-fiber cable is in use, if a transmission distance is extended up to several 10s of [km], then the work involved to lay the cables becomes complicated. Moreover, if a plurality of cables are laid, then a total length of cables extended becomes extremely long.

In view of the aforesaid aspects, it is an object of the present invention to provide an image pickup apparatus in which when a plurality of image pickup apparatus are disposed at installation places close to each other, the image pickup apparatus can be installed with ease.

DISCLOSURE OF INVENTION

According to a first invention, in a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the image pickup apparatus include a first selecting means for selectively outputting a first shot video result from the image pickup apparatus and a second shot video result containing shot video results from other image pickup apparatus connected to each other based on a control signal from one control apparatus from a plurality of control apparatus and in which the control apparatus include a second selecting means supplied with the first or second shot video result which is a shot video result selectively outputted through one predetermined cable from one image pickup apparatus of a plurality of image pickup apparatus, selecting the first shot video result and the second shot video result based on the control signal inserted into the first or second shot video result and outputting the second shot video result to other control apparatus connected when the second shot video result is selected.

According to a second invention, there is provided a camera system in which the predetermined cable is an optical-fiber cable.

According to a third invention, there is provided a camera system in which the image pickup apparatus include a multiplexing means for multiplexing the first shot video result or the second shot video result outputted from the first selecting means and a multiplexed shot video result is outputted from the image pickup apparatus.

According to a fourth invention, there is provided a camera system in which the first shot video result comprises video signals of red, green and blue color signals composed of digital signals and data other than the video signals and the second shot video result comprises a video signal composing a luminance signal and a chroma signal composed of digital signals from the image pickup apparatus for outputting the first shot video result and a video signal from image pickup apparatus.

According to a fifth invention, there is provided a camera system in which the control apparatus include a separating means for separating inputted first or second shot video result thus multiplexed and outputting the thus separated shot video result to the second selecting means.

According to a sixth invention, there is provided a camera system in which the image pickup apparatus include a first converting means supplied with red, green and blue signals composed of digital signals of the first shot video result and outputting a luminance signal and a chroma signal composed of digital signals contained in the second shot video result.

According to a seventh invention, there is provided a camera system in which the control means includes a second converting means for demodulating the luminance signal and the chroma signal composed of digital signals contained in the second shot video result to provide red, green and blue digital color signals.

According to an eighth invention, there is provided a camera system in which the control signal for selectively controlling the first selecting means is transmitted to the image pickup apparatus through the predetermined cable from the control apparatus.

According to a ninth invention, in a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the image pickup apparatus include an external switching means and a first selecting means for selectively outputting a first shot video result from the image pickup apparatus and a second shot video result containing shot video results from other image pickup apparatus connected to each other based on a control signal from one control apparatus from a plurality of control apparatus and in which the control apparatus include a second selecting means supplied with the first or second shot video result which is a shot video result selectively outputted through one predetermined cable from one image pickup apparatus of a plurality of image pickup apparatus, selecting the first shot video result and the second shot video result based on the control signal inserted into the first or second shot video result and outputting the second shot video result to other control apparatus connected when the second shot video result is selected.

According to a tenth invention, there is provided a camera system in which the image pickup apparatus include a multiplexing means for multiplexing the first shot video result or the second shot video result outputted from the first selecting means and a multiplexed shot video result is outputted from the image pickup apparatus.

According to an eleventh invention, there is provided a camera system in which the first shot video result comprises video signals of red, green and blue color signals composed of digital signals and data other than the video signals and the second shot video result comprises a video signal composing a luminance signal and a chroma signal composed of digital signals from the image pickup apparatus for outputting the first shot video result and a video signal from image pickup apparatus.

According to a twelfth invention, there is provided a camera system in which the control apparatus include a separating means for separating inputted first or second shot video result thus multiplexed and outputting the thus separated shot video result to the second selecting means.

According to a thirteenth invention, there is provided a camera system in which the image pickup apparatus include a first converting means supplied with red, green and blue signals composed of digital signals of the first shot video result and outputting a luminance signal and a chroma signal composed of digital signals contained in the second shot video result.

According to a fourteenth invention, there is provided a camera system in which the control apparatus includes a second converting means for demodulating the luminance signal and the chroma signal composed of digital signals contained in the second shot video result to provide red, green and blue digital color signals.

According to a fifteenth invention, there is provided a camera system, in which the predetermined cable is an optical-fiber cable.

According to a sixteenth invention, in a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the image pickup apparatus include an external switching means and a first selecting means for selectively outputting a first shot video result from the image pickup apparatus and a second shot video result containing shot video results from other image pickup apparatus connected to each other based on a control signal from one control apparatus from a plurality of control apparatus and in which the control apparatus are connected to the external switching means through a cable of a system different from the predetermined cable and include a second selecting means supplied with the first or second shot video result which is a shot video result selectively outputted through one predetermined cable from one image pickup apparatus of a plurality of image pickup apparatus, selecting the first shot video result and the second shot video result based on the control signal outputted from the external switching means through the cable of the different system and outputting the second shot video result to other control apparatus connected to the control apparatus when the second shot video result is selected.

According to a seventeenth invention, there is provided a camera system in which the predetermined cable is an optical-fiber cable and the cable of the system different from that of the predetermined cable is a wire cable.

According to an eighteenth invention, there is provided a camera system in which the image pickup apparatus include a multiplexing means for multiplexing the first shot video result or the second shot video result outputted from the first selecting means and a multiplexed shot video result is outputted from the image pickup apparatus.

According to a nineteenth invention, there is provided a camera system in which the first shot video result comprises video signals of red, green and blue color signals composed of digital signals and data other than the video signals and the second shot video result comprises a video signal composing a luminance signal and a chroma signal composed of digital signals from the image pickup apparatus for outputting the first shot video result and a video signal from image pickup apparatus.

According to a twentieth invention, there is provided a camera system in which the control apparatus include a separating means for separating inputted first or second shot video result thus multiplexed and outputting the thus separated shot video result to the second selecting means.

According to a twenty-first invention, there is provided a camera system in which the image pickup apparatus include a first converting means supplied with red, green and blue signals composed of digital signals of the first shot video result and outputting a luminance signal and a chroma signal composed of digital signals contained in the second shot video result.

According to a twenty-second invention, there is provided a camera system in which the control apparatus includes a second converting means for demodulating the luminance signal and the chroma signal composed of digital signals contained in the second shot video result to provide red, green and blue digital color signals.

According to a twenty-third invention, in a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the control apparatus include a first selecting means supplied with a first video signal containing a video signal for re-transmitting the video signal shot by the image pickup apparatus to the image pickup apparatus and a second video signal containing video signals from other control apparatus connected to each other and selectively outputting the first video signal or the second video signal based on an control signal supplied from the outside, and the image pickup apparatus include a second selecting means supplied with the first or second shot video result which is a shot video result selectively outputted through one predetermined cable from one image pickup apparatus of a plurality of image pickup apparatus, selecting the first shot video result and the second shot video result based on the control signal inserted into the first or second shot video result and outputting the second shot video result to other control apparatus connected when the second shot video result is selected.

According to a twenty-fourth invention, there is provided a camera system in which the first video signal is a video signal used to re-transmit a video signal shot by the image pickup apparatus to the image pickup apparatus and a video signal for prompter.

According to a twenty-fifth invention, there is provided a camera system in which the video signal used to re-transmit the video signal shot by the image pickup apparatus to the image pickup apparatus is outputted when the first selecting means selectively outputs either of the first video signal and the second video signal.

According to a twenty-sixth invention, there is provided a camera system in which the video signal used to re-transmit the video signal shot by the image pickup apparatus to the image pickup apparatus is outputted when the second selecting means selectively outputs either of the first video signal and the second video signal.

According to a twenty-seventh invention, there is provided a camera system in which the predetermined cable is an optical-fiber cable.

According to a twenty-eighth invention, there is provided a camera system in which the control apparatus include a multiplexing means for multiplexing the first shot video result or the second shot video result outputted from the first selecting means and a multiplexed shot video result is outputted from the control apparatus.

According to a twenty-ninth invention, there is provided a camera system in which the image pickup apparatus include a separating means for separating the inputted and multiplexed first or second video signal and outputting separated first or second video signal to the second selecting means.

According to a thirtieth invention, there is provided a camera system in which the image pickup apparatus include a digital signal processing means and a display means wherein when the first video signal is selected and outputted from the second selecting means, the first video signal is inputted to the digital signal processing means and the video signal thus processed by the digital signal processing means is displayed on the display means and when the second video signal is outputted from the second selecting means, the second video signal is outputted to other image pickup apparatus connected to each other.

According to a thirty-first invention, there is provided a camera system in which the display means is a viewfinder and a prompter disposed on the image pickup apparatus, a video signal, contained in the first video signal, used to re-transmit a video signal shot by the image pickup apparatus is inputted through the digital signal processing means to the viewfinder, and the first video signal other than the video signal inputted to the viewfinder is inputted through the digital signal processing circuit to the prompter.

According to a thirty-second invention, there is provided a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the control apparatus include an external switching means and a first selecting means for selectively outputting a first shot video result from the image pickup apparatus and a second shot video result containing shot video results from other image pickup apparatus connected to each other based on a control signal from one control apparatus from a plurality of control apparatus and in which the image pickup apparatus include a second selecting means supplied with the first or second shot video result which is a shot video result selectively outputted from one control apparatus of a plurality of control apparatus through the one predetermined cable, selectively outputting the first shot video result or the second shot video result based on the control signal inserted into the first or second video signal, and outputting the second video signal to other image pickup apparatus connected to the image pickup apparatus when the second video signal is selected.

According to a thirty-third invention, there is provided a camera system in which the first video signal is a video signal used to re-transmit a video signal shot by the image pickup apparatus to the image pickup apparatus and a video signal for prompter.

According to a thirty-fourth invention, there is provided a camera system in which the video signal used to re-transmit the video signal shot by the image pickup apparatus to the image pickup apparatus is outputted when the first selecting means selectively outputs either of the first video signal and the second video signal.

According to a thirty-fifth invention, there is provided a camera system in which the video signal used to re-transmit the video signal shot by the image pickup apparatus to the image pickup apparatus is outputted when the second selecting means selectively outputs either of the first video signal and the second video signal.

According to a thirty-sixth invention, there is provided a camera system in which the predetermined cable is an optical-fiber cable.

According to a thirty-seventh invention, there is provided a camera system in which the control apparatus include a multiplexing means for multiplexing the first shot video result or the second shot video result outputted from the first selecting means and a multiplexed shot video result is outputted from the control apparatus.

According to a thirty-eighth invention, there is provided a camera system in which the image pickup apparatus include a separating means for separating the inputted and multiplexed first or second video signal and outputting separated first or second video signal to the second selecting means.

According to a thirty-ninth invention, there is provided a camera system in which the image pickup apparatus include a digital signal processing means and a display means wherein when the first video signal is selected and outputted from the second selecting means, the first video signal is inputted to the digital signal processing means and the video signal thus processed by the digital signal processing means is displayed on the display means and when the second video signal is outputted from the second selecting means, the second video signal is outputted to other image pickup apparatus connected to each other.

According to a fortieth invention, there is provided a camera system in which the display means is a viewfinder and a prompter disposed on the image pickup apparatus, a video signal, contained in the first video signal, used to re-transmit a video signal shot by the image pickup apparatus is inputted through the digital signal processing means to the viewfinder, and the first video signal other than the video signal inputted to the viewfinder is inputted through the digital signal processing circuit to the prompter.

According to a forty-first invention, in a camera system comprising a plurality of image pickup apparatus for taking a picture of a desired object and outputting a shot video result through a predetermined cable and a plurality of control apparatus for controlling the image pickup apparatus and wherein a plurality of image pickup apparatus are connected to each other and transmit shot video results to a plurality of control apparatus through the predetermined cables, there is provided a camera system in which the control apparatus include a first selecting means supplied with a video signal used to re-transmit a video signal shot by the image pickup apparatus to the image pickup apparatus and a second video signal containing video signals from other control apparatus connected to each other and selectively outputting the first video signal or the second video signal based on a control signal from the outside, and in which the image pickup apparatus are connected through one cable of a system different from the predetermined cable and include a second selecting means supplied with the first or second video signal selectively outputted through the one predetermined cable from one control apparatus of a plurality of control apparatus, selectively outputting the first video signal or the second video signal based on a control signal transmitted through the cable of the different system and outputting the second video signal to other image pickup apparatus connected to the image pickup apparatus when the second video signal is selected.

According to a forty-second invention, there is provided a camera system in which the first video signal is a video signal used to re-transmit a video signal shot by the image pickup apparatus to the image pickup apparatus and a video signal for prompter.

According to a forty-third invention, there is provided a camera system in which the video signal used to re-transmit the video signal shot by the image pickup apparatus to the image pickup apparatus is outputted when the first selecting means selectively outputs either of the first video signal and the second video signal.

According to a forty-fourth invention, there is provided a camera system in which the video signal used to re-transmit the video signal shot by the image pickup apparatus to the image pickup apparatus is outputted when the second selecting means selectively outputs either of the first video signal and the second video signal.

According to a forty-fifth invention, there is provided a camera system in which the predetermined cable is an optical-fiber cable.

According to a forty-sixth invention, there is provided a camera system in which the control apparatus include a multiplexing means for multiplexing the first video signal or the second video signal outputted from the first selecting means and a multiplexed video signal is outputted from the control apparatus.

According to a forty-seventh invention, there is provided a camera system in which the image pickup apparatus include a separating means for separating the inputted and multiplexed first or second video signal and outputting separated first or second video signal to the second selecting means.

According to a forty-eighth invention, there is provided a camera system in which the image pickup apparatus include a digital signal processing means and a display means wherein when the first video signal is selected and outputted from the second selecting means, the first video signal is inputted to the digital signal processing means and the video signal thus processed by the digital signal processing means is displayed on the display means and when the second video signal is outputted from the second selecting means, the second video signal is outputted to other image pickup apparatus connected to each other.

According to a forty-ninth invention, there is provided a camera system in which the display means is a viewfinder and a prompter disposed on the image pickup apparatus, a video signal, contained in the first video signal, used to re-transmit a video signal shot by the image pickup apparatus is inputted through the digital signal processing means to the viewfinder, and the first video signal other than the video signal inputted to the viewfinder is inputted through the digital signal processing circuit to the prompter.

According to a fiftieth invention, in a plurality of image pickup apparatus for picking up an image of a desired object and outputting a shot video result through a predetermined cable, there is provided an image pickup apparatus in which the image pickup apparatus comprises an external switching means and a selecting means for selecting an inputted first shot video result from the image pickup apparatus and a second shot video result containing shot video results from other image pickup apparatus connected to each other and outputting the first or second selected video result through the one predetermined cable to an external device based on a control signal from the external switching means.

According to a fifty-first invention, there is provided an image pickup apparatus in which the predetermined cable is an optical-fiber cable.

According to a fifty-second invention, there is provided an image pickup apparatus in which the image pickup apparatus multiplex the first shot video result or the second shot video result outputted from the selecting means and output the first or second multiplexed shot video result through the predetermined cable to the external device.

According to a fifty-third invention, there is provided an image pickup apparatus in which the first shot video result comprises video signals of red, green and blue color signals composed of digital signals and data other than the video signals and the second shot video result comprises a video signal composing a luminance signal and a chroma signal composed of digital signals from the image pickup apparatus for outputting the first shot video result and a video signal from image pickup apparatus.

According to a fifty-fourth invention, there is provided an image pickup apparatus in which the image pickup apparatus includes a converting means supplied with red, green and blue color signals of digital signals of the first shot video result and outputting the luminance signal and the chroma signal composed of digital signals contained in the second shot video result.

As described above, according to the present invention, if other shot video results inputted from the outside are outputted to the cable together with shot video result, the first video signal inputted from this cable is displayed on the predetermined display means and the second video signal inputted thereto from this cable is outputted to the outside, then this cable can be used in common with the external device.

At that time, if the aforesaid cable is formed of signal lines through which previous shot video result, other shot video result, the first video signal and the second video signal are transmitted, then respective signals can be transmitted only by connecting respective signal line.

Otherwise, if the previous image pickup apparatus multiplexes shot video result and other shot video results and outputs multiplexed shot video result to the cable, then a signal line of one system within the cable can be used in common.

Further, if the previous shot video result is converted into serial data and then outputted to the cable in the first operation mode and the transmission band of the previous shot video result is reduced and multiplexed with other shot video results inputted thereto from the outside thereby being converted into serial data and the serial data is outputted to the cable in the second operation mode, then when the shot video result is transmitted in the form of serial data, the cable can be used in common.

At that time, if the color signals of red, green and blue are multiplexed with predetermined control data and converted into serial data in the first operation mode and the color signals of red, green and blue are converted into a luminance signal and a chroma signal of digital signals, multiplexed with a luminance signal and a chroma signal formed of other shot video results and thereby converted into serial data in the second operation mode, then shot video results of two systems can be transmitted in the second operation mode by using the signal line in which the digital signals of four systems are multiplexed and transmitted in the first operation mode.

Further, at that time, if the color signal generated from the color signals of red, green and blue is band-limited, converted into the previous chroma signal and the transmission band of previous shot video result is reduced, then the shot video result that was transmitted according to a 4:4:4 color difference format, for example, in the first operation mode can be transmitted according to a 4:2:2 color difference format in the second operation mode.

Moreover, if previous shot video result is converted into serial data by applying shot video result to an image pickup apparatus which outputs shot video result to a predetermined cable, this serial data is multiplexed with other serial data and outputted to the previous cable, image data corresponding to the previous shot video result is separated from the serial data inputted from this cable and the thus separated image data is displayed on a predetermined display means, then when there is a sufficient space in the transmission line, this kind of image pickup apparatus can multiplex various data to shot video result and transmit multiplexed data.

Figure 1:
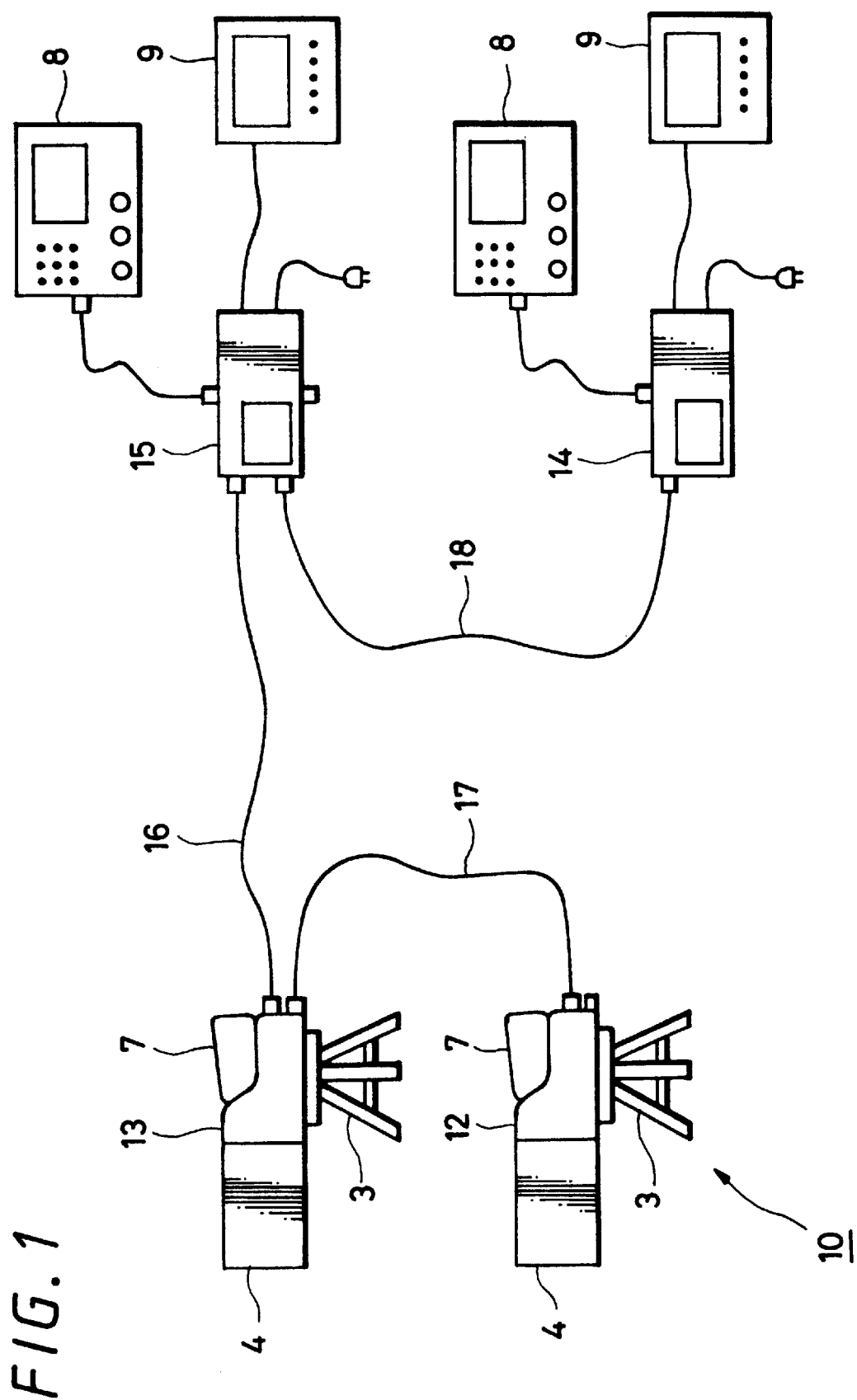
FIG. 1 is a schematic view illustrating a television camera system according to an embodiment of the present invention.
Figure 13:
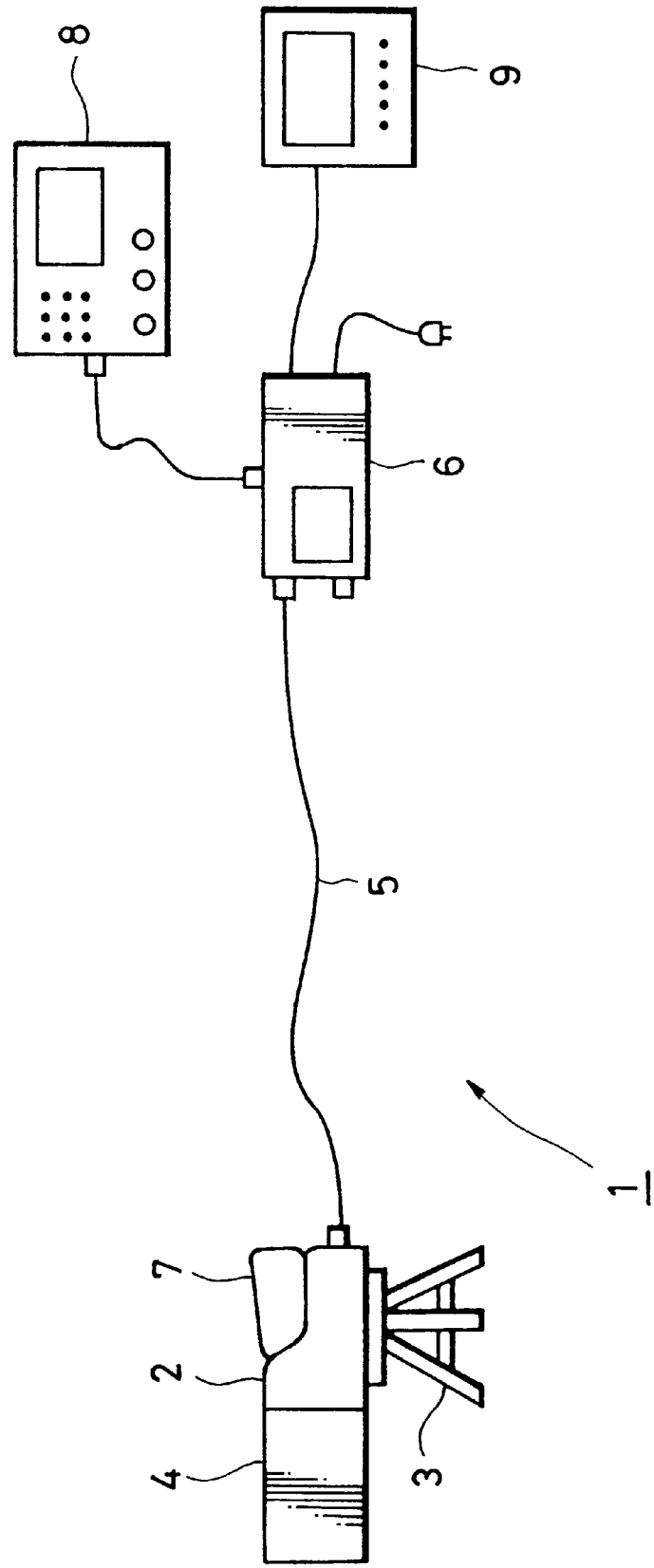
FIG. 13 is a schematic diagram showing a conventional television camera system.

BEST MODE FOR CARRYING OUT THE INVENTION (1) First embodiment:

FIG. 1 is a schematic diagram showing a television camera system according to an embodiment of the present invention. In this television camera system 10, camera head units 12 and 13 are disposed at the shooting place, camera control units 14 and 14 are disposed at a control room distant from the shooting place, and the shooting place and the control room are connected by a single optical-fiber cable 16. In the arrangement shown in FIG. 1, elements and parts identical to those of FIG. 13 are marked with the same references and need not be described.

In this shooting place, the camera head units 12 and 13 are connected by an optical-fiber cable 17. In the control room, the camera control units 14 and 15 are connected by an optical-fiber cable 18. The camera head unit 13 and the camera control unit 15 are connected via the optical-fiber cable 16.

Each of the optical-fiber cables 16, 17, 18 is a bundle of optical fiber (hereinafter referred to as "main-line system optical fiber") for transmitting shot video result and optical fiber (hereinafter referred to as "return-system optical fiber") for transmitting returned image. Thus, the camera head unit 13 and the camera control unit 15 are capable of transmitting and receiving video signals in the two-way fashion through the optical-fiber cable 16, and the camera head unit 12 and the camera control unit 15 are capable of transmitting and receiving video signals in the two-way fashion through the camera head unit 13 and the camera control unit 15.

Figure 2:
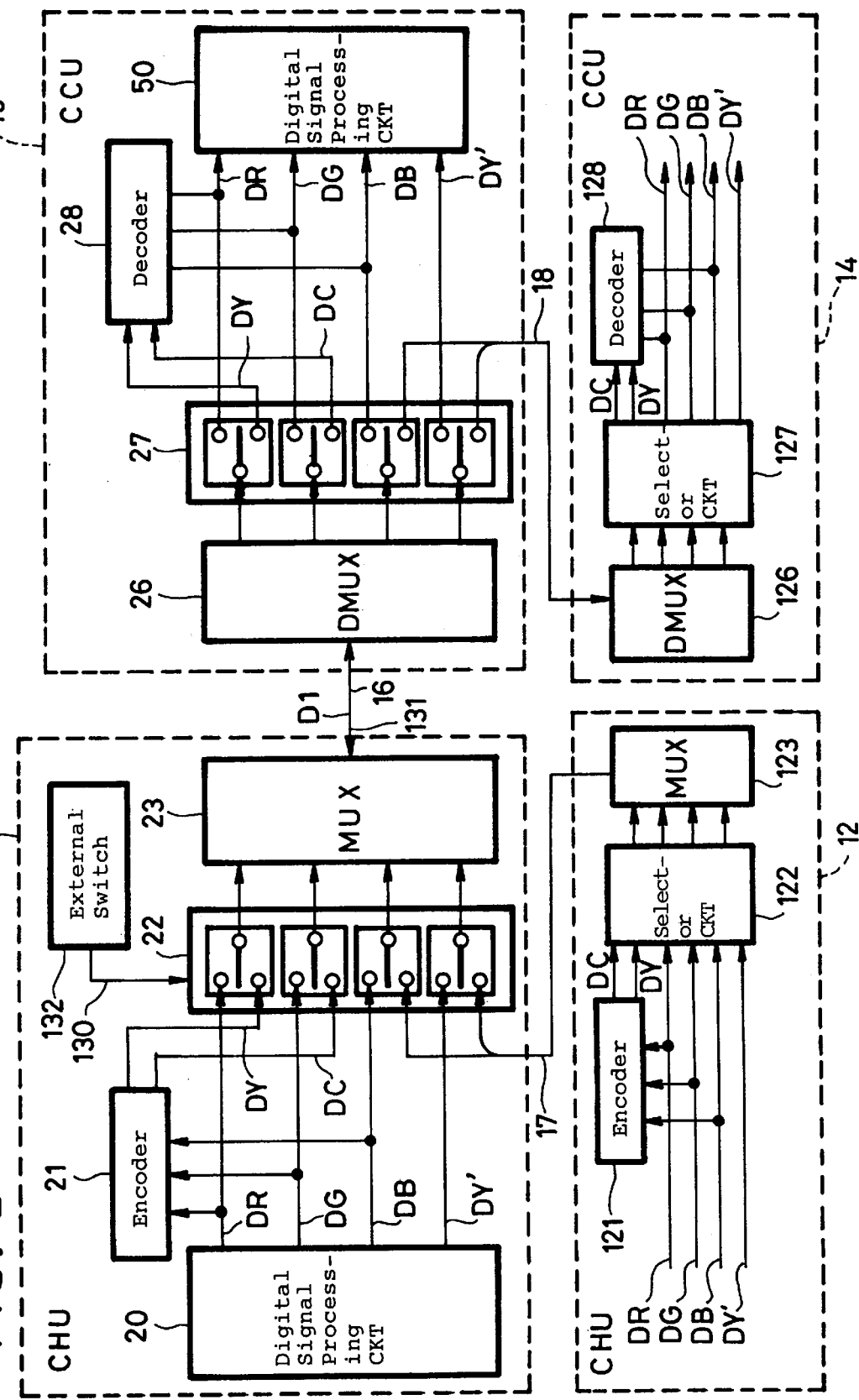
FIG. 2 is a block diagram showing a main-line system of FIG. 1.

As shown in the main-line system of FIG. 2, the camera head unit 13 generates red, green and blue color signals from an output signal of a CCD solid-state imaging device, and processes these color signals to provide digital color signals. In the camera head unit 13, a digital signal processing circuit 20 effects signal processing such as knee processing or gamma processing on these digital color signals, and outputs these digital color signals DR, DG, DB of 10 bits at the clock period of 13.5 [MHz]. Thus, the digital color signals DR, DG, DB are outputted from the digital signal processing circuit 20 at a transmission rate of 135 [Mbps].

Further, the digital signal processing circuit 20 generates a digital luminance correction signal DY' for improving a quality of picture used in an EDTV (Extended Definition Television), and outputs the same at 10 bits and at the clock period of 13.5 [MHz]. Furthermore, at that time, the signal processing circuit 20 superimposes control data, audio signal or the like, transmitted to the camera control unit 15, upon this digital luminance correction signal DY'.

An encoder 21 computes the digital color signals DR, DG, DB to provide a digital luminance signal and digital color difference signals. Further, the encoder 21 generates a digital chroma signal by band-limiting the color difference signals and converts the same into a 4:2:2 color difference format by reducing a transmission band of shot video result, whereafter the encoder outputs a digital luminance signal DY and a digital chroma signal DC of digital signals to a selector circuit 22.

At that time, the encoder 21 outputs the digital luminance signal DY and the digital chroma signal DC at 10 bits and at the clock period of 13.5 [MHz] corresponding to each of the digital color signals DR, DG, DB.

The selector circuit 22 comprises four-system switches whose contacts are switched in response to a control signal from the camera control unit 15 or a selection control signal 130 from an external switch 132 of the camera head unit 13, and is adapted to selectively output the digital color signals DR, DG, DB and the digital luminance correction signal DY' outputted from the digital signal processing circuit 20. The control signal outputted from the camera control unit 15 or the control signal 130 from the external switch 132 is superimposed upon the digital luminance correction signal DY' and then outputted.

On the other hand, when the selector circuit 22 is changed in position in response to the control signal from the camera control unit 15 or the control signal 130 from the external switch 132, a digital luminance correction signal DY, a digital chroma signal DC and a digital signal inputted from an external device are selectively outputted instead of the digital color signals DR, DG, DB and the digital luminance correction signal DY'. At that time, the control signal from the camera control unit 15 or the control signal 130 from the external switch is interposed into the blanking period of the digital luminance signal DY and the digital chroma signal DC.

Accordingly, the selector circuit 22 outputs shot video results by using all of four systems corresponding to respective switches. When the respective switches are changed in position by the camera control unit 15 or the external switch 132, the selector circuit 132 outputs shot video results by using two systems in the four systems, and outputs a digital signal inputted from the outside by using the remaining two systems.

A multiplexer (MUX) 23 converts the digital signals of four systems outputted from the selector circuit 22 into serial data and multiplexes the serial data at the bit unit. Thus, the multiplexer 23 converts the digital signals of four systems inputted thereto at a transmission rate of 135 [Mbps] into transmission data D1 of transmission rate of 540 [Mbps]. Further, the multiplexer 23 outputs the transmission data D1 to the optical-fiber cable 16.

Thus, the camera head unit 13 reduces a transmission band of shot video result, multiplexes the same with the digital signal inputted thereto from the external device and transmits the thus multiplexed digital signal to the optical fiber of the main-line system. According to this embodiment, inasmuch as the camera head unit 12 serving as the external device is connected through the optical-fiber cable 17, the camera head unit 13 multiplexes the shot video result to the shot video result of the camera head unit 12.

Specifically, the camera head unit 12 is of the same arrangement as that of the camera head unit 13. When this camera head unit is connected to the camera head unit 13, the selector circuit 122 selects its contacts in response to the control signal from the camera control unit 15 or the control signal 130 from the external switch, whereby the digital luminance signal DY and the digital chroma signal DC of 4:2:2 color difference format outputted from the encoder 121 are inputted to the multiplexer 123. Thus, the camera head unit 12 transmits shot video result of 4:2:2 color difference format to the camera head unit 13 through the optical-fiber cable 17 at a transmission rate of 270 [Mbps] (i.e. D1 format based on SMPTE (Society of Motion Picture and Television Engineers)).

The camera head unit 13 multiplexes digital video signals of two systems based on the D1 format according to the SMPTE standard at the bit unit and transmits the thus multiplexed digital video signal to the control unit 15.

On the other hand, in the main-line system, the camera control unit 15 is supplied with transmission data D1 transmitted through the optical-fiber cable 16, and a demultiplexer (DMUX) 26 distributes sequentially and cyclically the transmission data D1 to output terminals of four systems to thereby demultiplex the multiplexed digital signals of four systems.

A selector circuit 27 in the camera control unit 15 comprises switches of four systems in association with the selector circuit 22 of the camera head unit 13, and switches of the selector circuit 27 are changed in position in unison in response to the control signal 130 superimposed upon the digital luminance correction signal DY' from the camera head unit 13 or the control signal 130 interposed on the blanking period of the digital chroma signal DC. Specifically, when the digital color signals DR, DG, DB and the digital luminance correction signal DY' from the camera head unit 13 are inputted to the selector circuit 27, the switches of the selector circuit 27 are changed in position in response to the control signal 130 superimposed upon the digital luminance correction signal DY' in such a manner as to output the digital color signals DR, DG, DB and the digital luminance correction signal DY' to the digital signal processing circuit 50.

Figure 3:
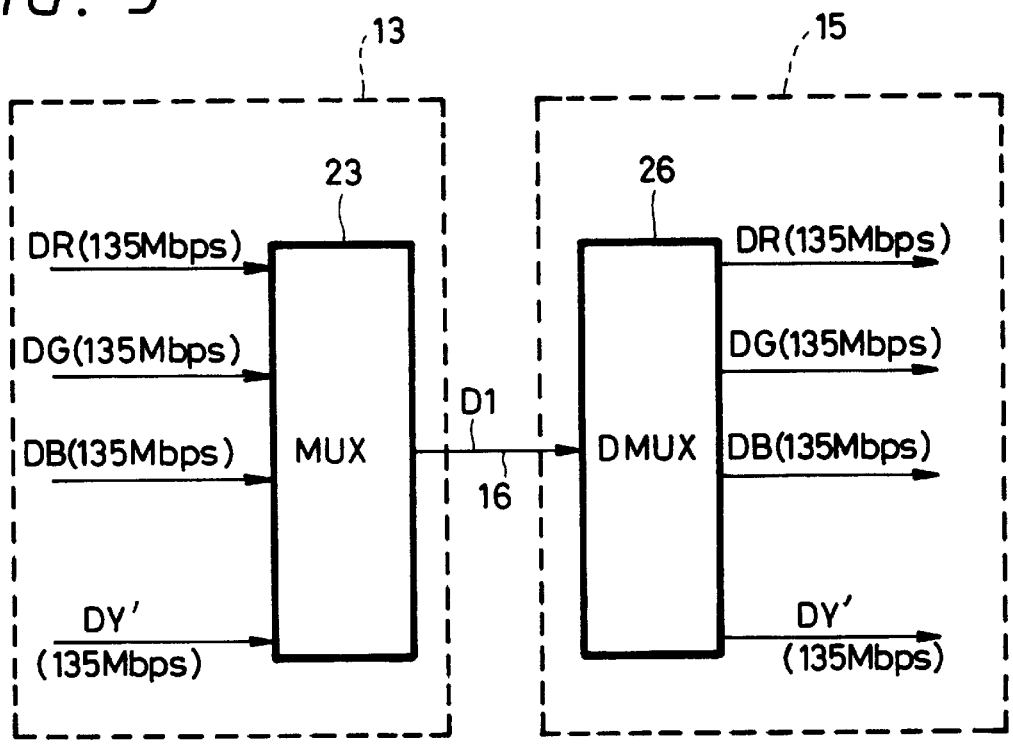
FIG. 3 is a block diagram showing a manner in which shot video result is transmitted according to a 4:4:4 color difference format through a main-line system of FIG. 2.

Accordingly, as shown in FIG. 3, the transmission data D1 can be transmitted from the camera head unit 13 to the camera control unit 15 at a transmission rate of 540 [Mbps] through a transmission line 16 made of an optical-fiber cable. The digital color signals DR, DG, DB and the digital luminance correction signal DY' are inputted to the multiplexer 23, and the digital luminance correction signal DY' can be transmitted satisfactorily through the transmission line with a transmission rate of 135 [Mbps] so that the digital luminance correction signal with other data, e.g. audio signal or the like added thereto can be transmitted.

As described above, when the digital color signals DR, DG, DB and the digital luminance correction signal DY' are selectively outputted from the selector circuit 27, the video signal that was outputted from the camera head unit 13 to a digital signal processing circuit 50 is outputted to a monitor 9 connected to the camera control unit 15.

On the other hand, when the digital luminance signal DY, the digital chroma signal DC from the camera head unit 13 and the digital signal from the camera head unit 12 are inputted to the selector circuit 27, the switches of the selector circuit 27 are changed in position in response to the control signal 130 interposed into the blanking period of the digital luminance signal DY or the digital chroma signal DC, whereby the digital luminance signal DY and the digital chroma signal DC are outputted to a decoder 28 of the camera control unit 15 and the digital video signal from the camera head unit 12 is outputted to the camera control unit 14 through an optical-fiber cable 18.

The decoder 28 executes a processing opposite to that of the encoder 21, and digitally processes the digital luminance signal DY and the digital chroma signal DC to demodulate the digital color signals DR, DG, DB.

On the other hand, the camera control unit 14 is of the same arrangement as that of the camera control unit 15. When it is connected to the camera control unit 14, if the selector circuit 27 switches the contacts, then the digital luminance signal DY and the digital chroma signal DC inputted thereto from the camera control unit 15 are inputted through the demultiplexer 126 to the decoder 128 which demodulates them to provide the digital color signals DR, DG, DB.

Figure 4:
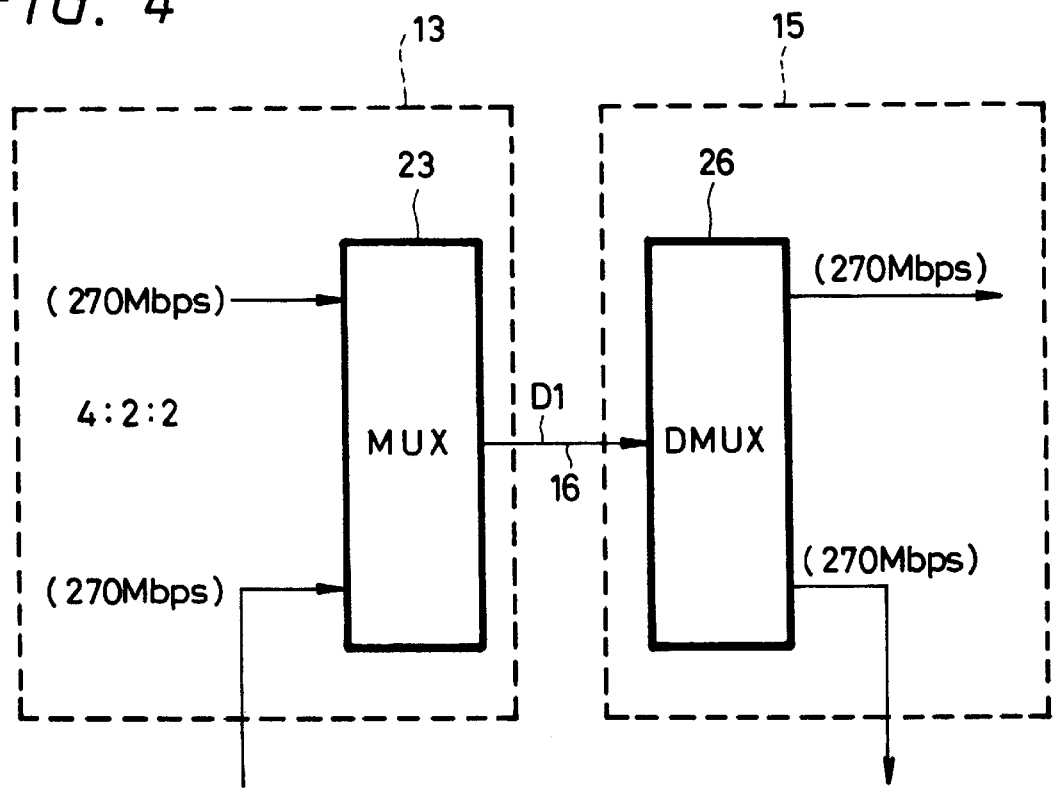
FIG. 4 is a block diagram showing a manner in which video result is transmitted according to a 4:2:2 color difference format through the main-line system of FIG. 2.

Therefore, as shown in FIG. 4, the camera head units 12, 13 and the camera control units 14, 15 can transmit shot video result with the 4:2:2 color difference format at a transmission rate of 540 [Mbps] through the common transmission line composed of the optical-fiber cable 16.

In actual practice, when this kind of shot video result is processed, in the processing such as chromakey, while a picture without a sense of incongruity cannot be obtained by the video signal containing the luminance correction signal, the 4:2:2 color difference format is sufficient in the normal television broadcasting or the like. On the other hand, when there is a strong demand for simplifying extra cable laying work, such color difference format is frequently used in television broadcasting and is very rarely used for the processing such as the chromakey. In this embodiment, shot video results of a plurality of channels can be transmitted by reducing the transmission band of shot video result in a range which is sufficiently wide in actual practice.

Figure 5:
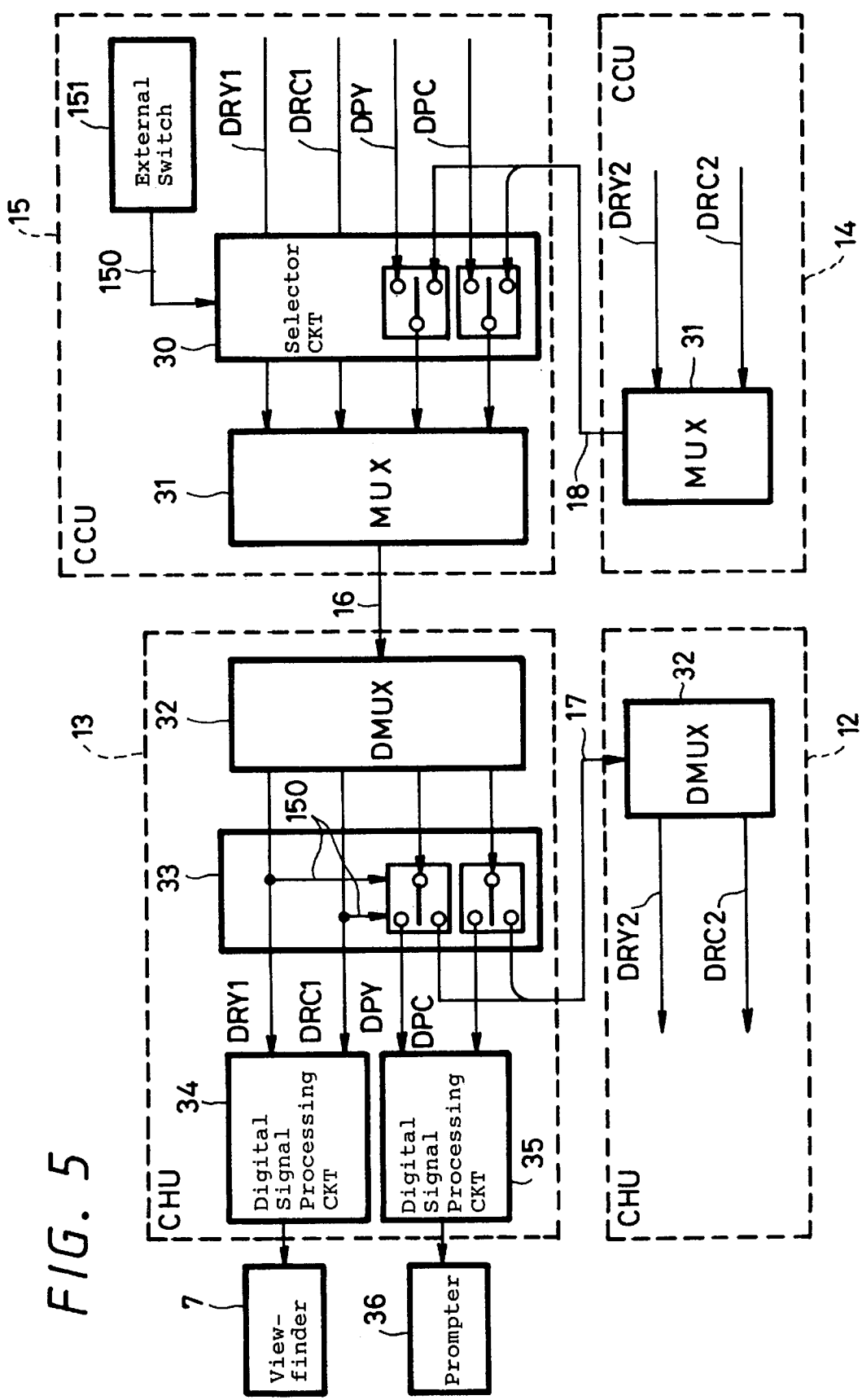
FIG. 5 is a block diagram showing a return system of FIG. 1.

FIG. 5 is a block diagram showing an arrangement of a return system wherein digital signals of four systems are multiplexed on the transmission line composed of the optical-fiber cable 16 at a transmission rate of 135 [Mbps] from the camera control unit 15 to the camera head unit 13 in the manner opposite to that of the main-line system.

Specifically, in the camera control unit 15, the selector circuit 30 receives a digital luminance signal DRY1 and a digital chroma signal DRC1 of return image from a console (not shown), and outputs the digital luminance signal DRY1 and the digital chroma signal DRC1 to a multiplexer 31. The digital luminance signal DRY1 and the digital chroma signal DRC1 are inputted at a transmission rate of 135 [Mbps], respectively. Incidentally, the digital luminance signal DRY1 and the digital chroma signal DRC1 have control data, audio data or the like for the camera head unit 13 interposed into the blanking period.

Figure 6:
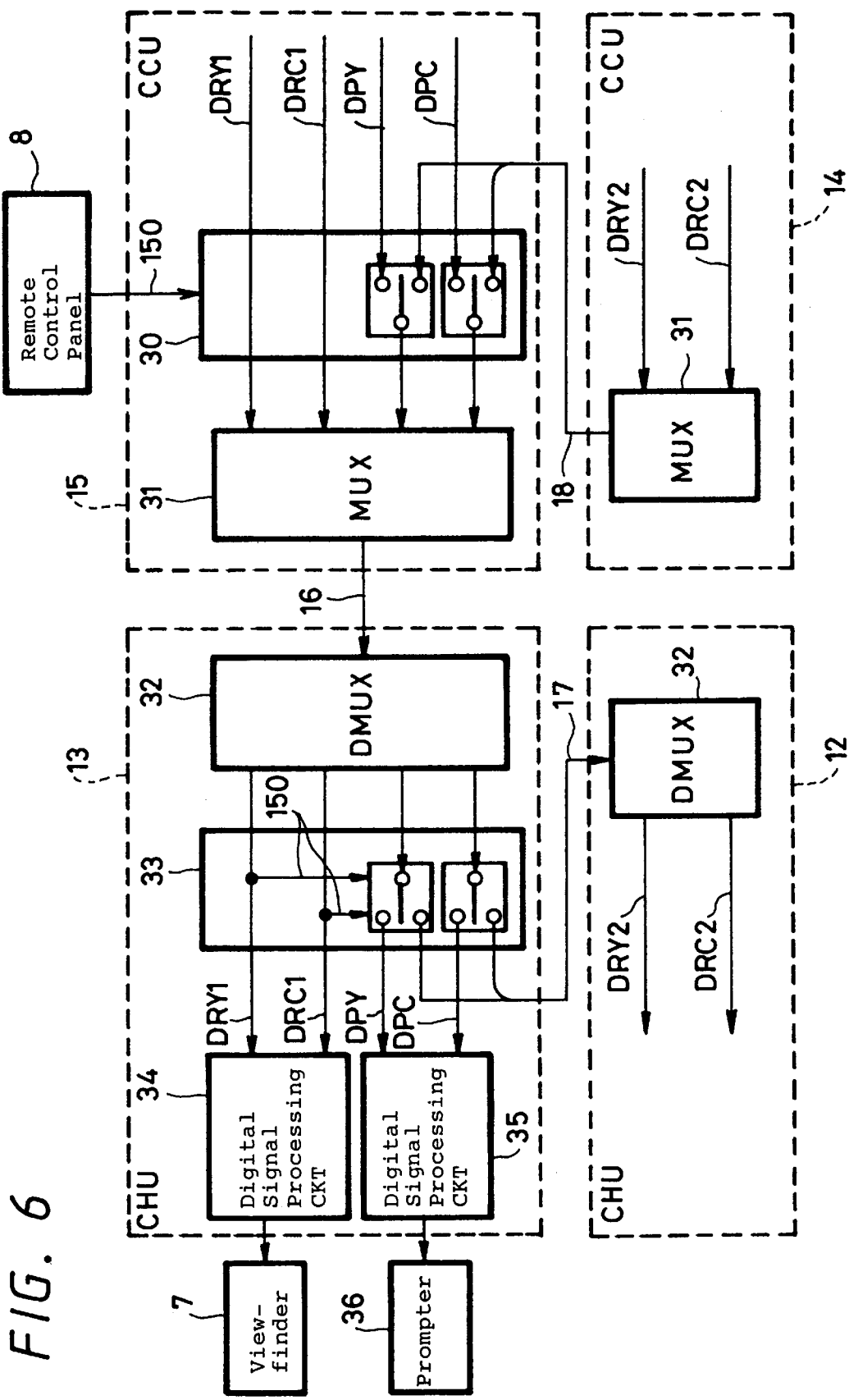
FIG. 6 is a block diagram showing other return system of FIG. 1.

The selector circuit 30 is similarly supplied with a digital luminance signal DPY and a digital chroma signal DPC for prompter from a console (not shown) and outputs the digital luminance signal DPY and the digital chroma signal DPC for prompter to the multiplexer 31. Further, when switches of the selector circuit 30 are changed in position in response to a control signal 150 (FIG. 6) from the control panel 8 or the selection signal 150 from an external switch 151 (FIG. 5) of the camera control unit 15, the selector circuit outputs the digital signal thus inputted from the outside to the multiplexer 31 instead of the digital luminance signal DPY and the digital chroma signal DPC for prompter.

This multiplexer 31 multiplexes the digital signals of four systems at the bit unit and outputs bit serial data of a transmission rate of 540 [Mbps] through the optical-fiber cable 16 to the camera head unit 13 on the return side, whereby the camera control unit 15 becomes able to transmit video signals of return image and prompter to the camera head unit 13.

On the other hand, the camera control unit 14 transmits a digital luminance signal DRY2 and a digital chroma signal DRC2 of the return image to the optical-fiber cable 18 through the multiplexer 31. The camera control unit 15 is supplied with the digital luminance signal DRY2 and the digital chroma signal DRC2 thus transmitted through the optical-fiber cable 18 as digital signals thus inputted from the outside.

Therefore, the camera control unit 15 is able to transmit return image and a variety of control data with respect to the return system by using the optical-fiber cable 16 in common with the camera control unit 14.

In the camera head unit 13, a demultiplexer 32 sequentially and cyclically distributes the digital signals thus inputted thereto through the optical-fiber cable 16 to the output terminals of the four systems to thereby demultiplex the digital signals of four systems thus multiplexed by the multiplexer 31.

A selector circuit 33 is configured in response to the selector circuit 30 of the camera control unit 15 and four switches in this embodiment switch contacts in unison with each other. Specifically, when the selector circuit 30 selects the video signals DRY1, DRC1, DPY, DPC of return image and prompter in response to the selection control signal 150, these video signals DRY1, DRC1, DPY, DPC are outputted from the selector circuit and multiplexed by the multiplexer 31. When the selector circuit 30 selects the digital signals DRY2, DRC2 thus inputted thereto from the outside in response to the selection control signal 150, the video signals DPY, DPC for prompter are switched to the digital signals DRY2, DRC2 thus inputted from the outside and then outputted from the selector circuit. The control signal 150 is interposed into the blanking period of the digital luminance signal DRY1 or the digital chroma signal DRC1 and transmitted to the camera head unit 13 together with control data, audio data or the like for the camera head unit 13. Then, the thus multiplexed video signal is transmitted to the camera head unit 13 through the optical-fiber cable 16, in which it is demultiplexed into digital signals of four systems by the demultiplexer 32 and then inputted to the selector circuit 33. In this selector circuit 33, when the prompter video signals DPY, DPC are inputted to the camera head unit 13 by the control signal 150 interposed into the video signals DRY1, DRC1 of return image, the video signals DPY, DPC are selectively outputted from the selector circuit 33. Further, when the selector circuit 33 in the camera control unit 15 selects and outputs the digital signals DRY2, DRC2 thus inputted from the outside to the camera head unit 13, the selector circuit selectively outputs the digital signals DRY2, DRC2 in response to the control signal 150 interposed into the video signals DRY1, DRC1 of return image.

The video signals DRY1, DRC1 of the return image and the prompter video signals DPY, DPC selected by the selecting circuit 33 are outputted to the digital signal processing circuits 34, 35 for return image and prompter, in which they are used to display return image on the viewfinder 7 and to display an image transmitted from the camera control unit 15 on the prompter, if necessary. Accordingly, a set of the camera control unit 15 and the camera head unit 13 can be independently used for rebroadcast or the like.

When the selector circuit 33 selects the video signals DRY1, DRC1 of return image and the digital signals DRY2, DRC2 inputted thereto from the outside, the video signals DRY1, DRC1 of return image are inputted to the digital signal processing circuit 34 for return image and the remaining digital signals DRY2, DRC2 inputted thereto from the outside are outputted to the external device through the optical-fiber cable 17.

In the camera head unit 12 connected as the external device, the demultiplexer 32 demultiplexes the video signals DRY2, DRC2 of return image composed of digital signals inputted thereto from the outside to output demultiplexed video signals to the corresponding digital signal processing circuit, thereby making it possible to display the return image.

With the above-mentioned arrangement, when a pair of the camera head unit 13 and the camera control unit 15 are used independently, the digital color signals DR, DG, DB and the digital luminance correction signal DY' outputted from the digital signal processing circuit 20 (FIG. 2) are inputted through the selector circuit 22 to the multiplexer 23, in which they are converted into bit serial transmission data D1 by multiplexing.

The transmission data D1 is transmitted through the optical-fiber cable 16 to the camera control unit 15 and demultiplexed into the digital signals of four system by the demultiplexer 26, thereby resulting in the original digital color signals DR, DG, DB and the original digital luminance correction signal DY' being demodulated.

On the other hand, in the camera control unit 15 (FIG. 5), the video signals DRY1, DRC1 and DPY, DPC of return image and prompter are inputted through the selector circuit 30 to the multiplexer 31, in which they are converted into serial data D1 of bit serial form by multiplexing.

The serial data D1 is transmitted to the camera head unit 13 through the return system of the optical-fiber cable 16 and the digital signals of four systems are demultiplexed by the demultiplexer 32, thereby resulting in the original video signals DRY1, DRC1 and DPY, DPC being demodulated. Thus, the video signals for return image and prompter transmitted from the camera control unit 15 are displayed on the viewfinder 7 and the prompter.

When the camera head units 12 and 13 are installed at the shooting place as in this embodiment and the camera head units 12 and 13 are connected by the optical-fiber cable 17 (FIG. 2), shot video result from the camera head unit 12 is converted into the digital luminance signal DY and the digital chroma signal DC with the 4:2:2 color difference format in which the digital color signals DR, DG, DB of the 4:4:4 shot video result are transmitted in transmission band by an encoder 121. The digital luminance signal DY and the digital chroma signal DC are transmitted to the camera head unit 13 through the optical-fiber cable 17.

On the other hand, the shot video result from the camera head unit 13 is converted into the digital signal DY and the digital chroma signal DC in which the digital color signals DR, DG, DB of the 4:4:4 shot video result are limited in transmission band by the encoder 21.

The digital luminance signals DY and the digital chroma signals DC of these two systems are multiplexed by the multiplexer 23, converted into bit serial transmission data D1, and resultant transmission data D1 is transmitted to the camera control unit 15 through the optical-fiber cable 16.

In the camera control unit 15, the transmission data D1 is converted into original digital signals of four systems, and the digital luminance signal DY and the digital chroma signal DC outputted from the camera head unit 13 are displayed on the monitor 9 or the like. On the other hand, the digital signals of the remaining two systems, i.e. the digital luminance signal DY and the digital chroma signal DC outputted from the camera head unit 12 are transmitted to the camera control unit 14 through the optical-fiber cable 18, whereby the shot video result from the camera head unit 12 is transmitted through the camera head unit 13 and the camera control unit 15 to the camera control unit 14.

The video signals DRY2, DRC2 (FIG. 5) of return image outputted from the camera control unit 14 are multiplexed by the multiplexer 31, and transmitted to the camera control unit 15 through the optical-fiber cable 18. Thus, the video signals DRY2, DRC2 are multiplexed with the video signals DYR1, DRC1 of the camera control unit 15 by the multiplexer 31, converted into a bit serial digital signal, and then transmitted to the camera control unit 13 through the optical-fiber cable 16.

In the camera head unit 13, the thus transmitted digital signal is converted into the digital signals of four systems by the demultiplexer 32, and the video signals DRY1, DRC1 corresponding to the camera control unit 15 are outputted to the viewfinder 7 of the camera head unit 13, whereby the return image transmitted from the camera control unit 15 is transmitted to the camera head unit 13 side.

On the other hand, the video signals of the remaining two systems, i.e. the video signals DRY2, DRC2 corresponding to the camera control unit 14 are transmitted through the optical-fiber cable 17 to the camera head unit 12, in which they are processed in the same way as the camera head unit 13 processes the video signals. Thus, the return image transmitted from the camera control unit 14 is transmitted through the camera control unit 15 and the camera head unit 13 to the camera control unit 14.

With the above-mentioned arrangement, since the transmission bands of the shot video results are reduced, multiplexed and the optical-fiber cable 17 is used in common by the camera control unit and the camera head unit of the two systems, a cable laying work required when a plurality of camera head units are installed at the shooting place can be simplified.

Figure 7:
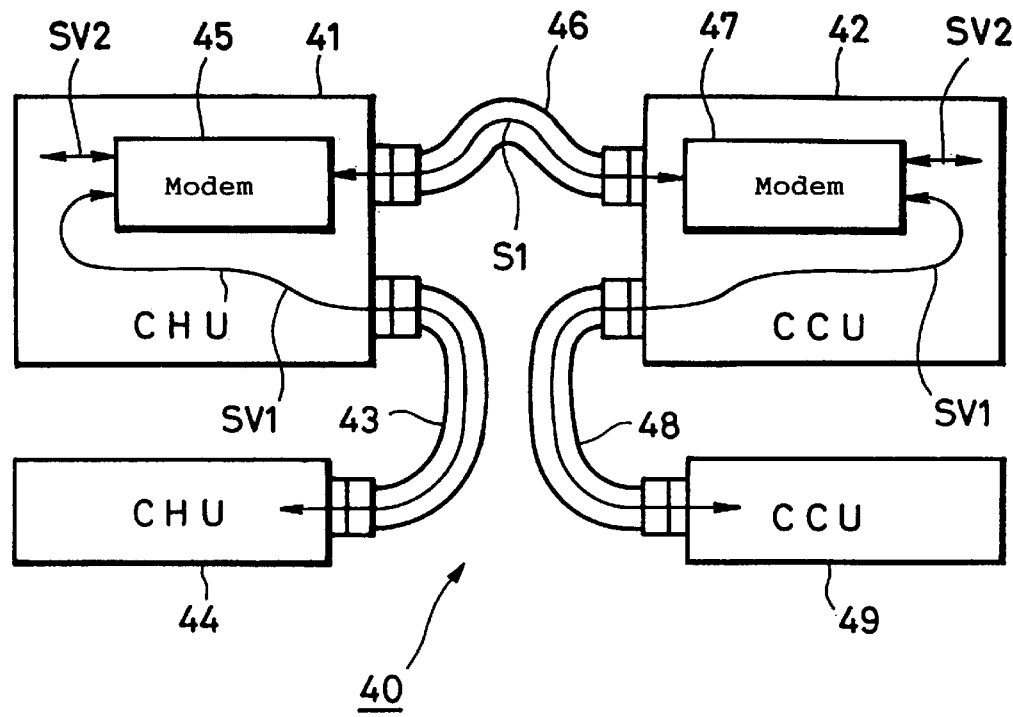
FIG. 7 is a schematic diagram showing a television camera system according to a second embodiment.

(2) Second embodiment:

FIG. 7 is a block diagram showing a television camera system according to a second embodiment. In this television camera system 40, a camera head unit 41 frequency-multiplexes shot video result and transmits the thus frequency-multiplexed result.

Figure 8A:
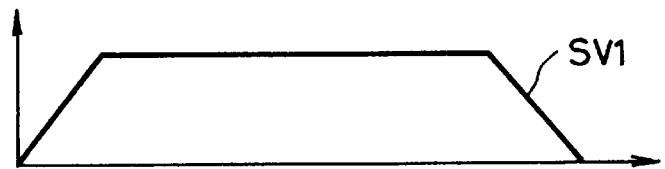
FIG. 8 is a characteristic graph used to explain an operation of FIG. 6.
Figure 8B:
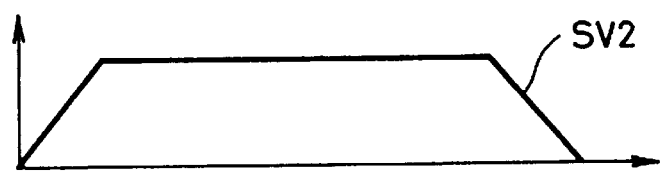
Figure 8C:
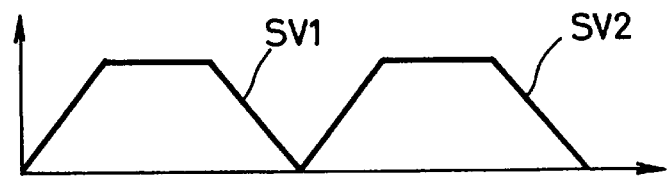

Specifically, as shown in FIG. 8, the camera head unit 41 receives a video signal SV1 (FIG. 8 (A)), which is frequency-converted to a predetermined frequency band by a camera head unit 44, through a triax cable 43, and inputs this video signal SV1 to a modem 45.

The modem 45 band-limits a video signal SV2 (FIG. 8 (B)) of shot video result and which is similarly frequency-converted into a predetermined frequency band and the video signal SV1 of shot video result from the camera head unit 44, frequency-multiplexes them (FIG. 8 (C)) and transmits the thus frequency-multiplexed signal to the main line of a triax cable 46.

Further, the modem 45 receives a frequency-multiplexed signal of return system of the triax cable 46, separates the frequency-multiplexed signal in band, and outputs the thus separated frequency-multiplexed signal to a predetermined signal processing system and the camera head unit 44. Thus, the camera head unit 41 separates and processes the video signal of return image thus frequency-multiplexed or the like, and outputs such video signal to the camera head unit 44.

In a camera control unit 42, a modem 47 receives a frequency-multiplexed signal from the main-line system of the triax cable 46 and converts this frequency-multiplexed signal into video signals SV1 and SV2. Further, the modem 47 outputs the video signal SV2 to a predetermined signal processing system, and outputs the remaining video signal SV1 through a triax cable 48 to a camera control unit 49.

Further, the modem 47 receives a video signal of return image from the camera control unit 49 through the return system of the triax cable 48 and frequency-multiplexes the video signal of return image transmitted to the camera head unit 41. Furthermore, the modem 47 transmits the resultant frequency-multiplexed signal to the return system of the triax cable 46.

According to the arrangement shown in FIG. 7, even if the video results are multiplexed by frequency-multiplexing, similar effects that the first embodiment has achieved can be achieved.

Figure 9:
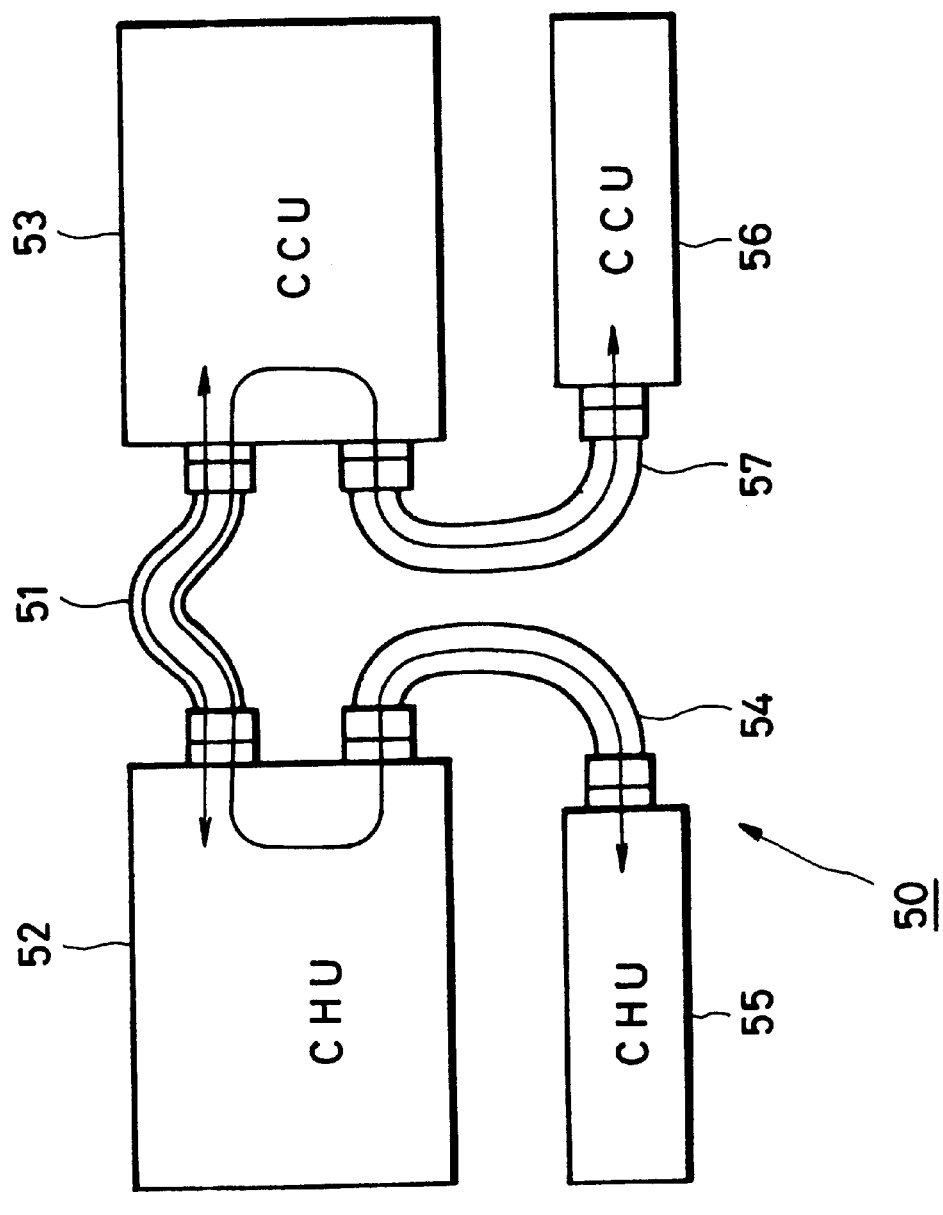
FIG. 9 is a schematic diagram showing a television camera system according to a third embodiment.

(3) Third embodiment:

FIG. 9 is a block diagram showing a television camera system according to a third embodiment. In this television camera system 50, a camera head unit 52 and a camera control unit 53 are connected through a cable 51 composed of a bundle of two triax cables.

Specifically, a camera head unit 55 is connected to the camera head unit 52 through an ordinary triax cable 54 to thereby transmit shot video result through the main-line of the triax cable 54, and inputs a video signal of return image transmitted from the camera control unit 56 through the return system of the triax cable 54.

On the other hand, the camera head unit 52 transmits shot video result inputted thereto through the triax cable 54 to the first main-line system and also transmits shot video result of the camera head unit 52 to the remaining second main-line system of the cable 51. Further, the camera head unit 52 transmits a video signal of return image inputted thereto from the first return system of this cable 51 to the return system of the triax cable 54. Furthermore, this camera head unit inputs a video signal of return image inputted thereto from the second return system of this cable 51 to a predetermined signal processing system.

On the other hand, the camera control unit 53 inputs shot video result inputted thereto from the second main-line system of the cable 51 to a predetermined signal processing circuit, and outputs a video signal of return system or the like to the second return system of this cable 51, whereby the camera control unit 53 is connected to the camera head unit 52 through the second main-line system and the return system of the cable 51.

Further, the camera control unit 53 transmits shot video results inputted thereto from the first main-line system of the cable 51 to the main-line system of the triax cable 57, and outputs the video signal inputted thereto from the return system of the triax cable 57 to the second return system of the cable 51.

The camera control unit 56 transmits a video signal of return image or the like to the return system of the triax cable 57, and inputs the video result inputted thereto from the main-line system of the triax cable 57 to a predetermined signal processing system, whereby the camera control unit 56 is connected to the camera head unit 55 through the cable 51 which is used in common by the camera head unit 52.

With the arrangement shown in FIG. 9, even if the camera head unit 52 and the camera control unit 53 are connected through the cable 51 composed of a bundle of two triax cables, similar effects that the first embodiment has achieved can be achieved.

Figure 10:
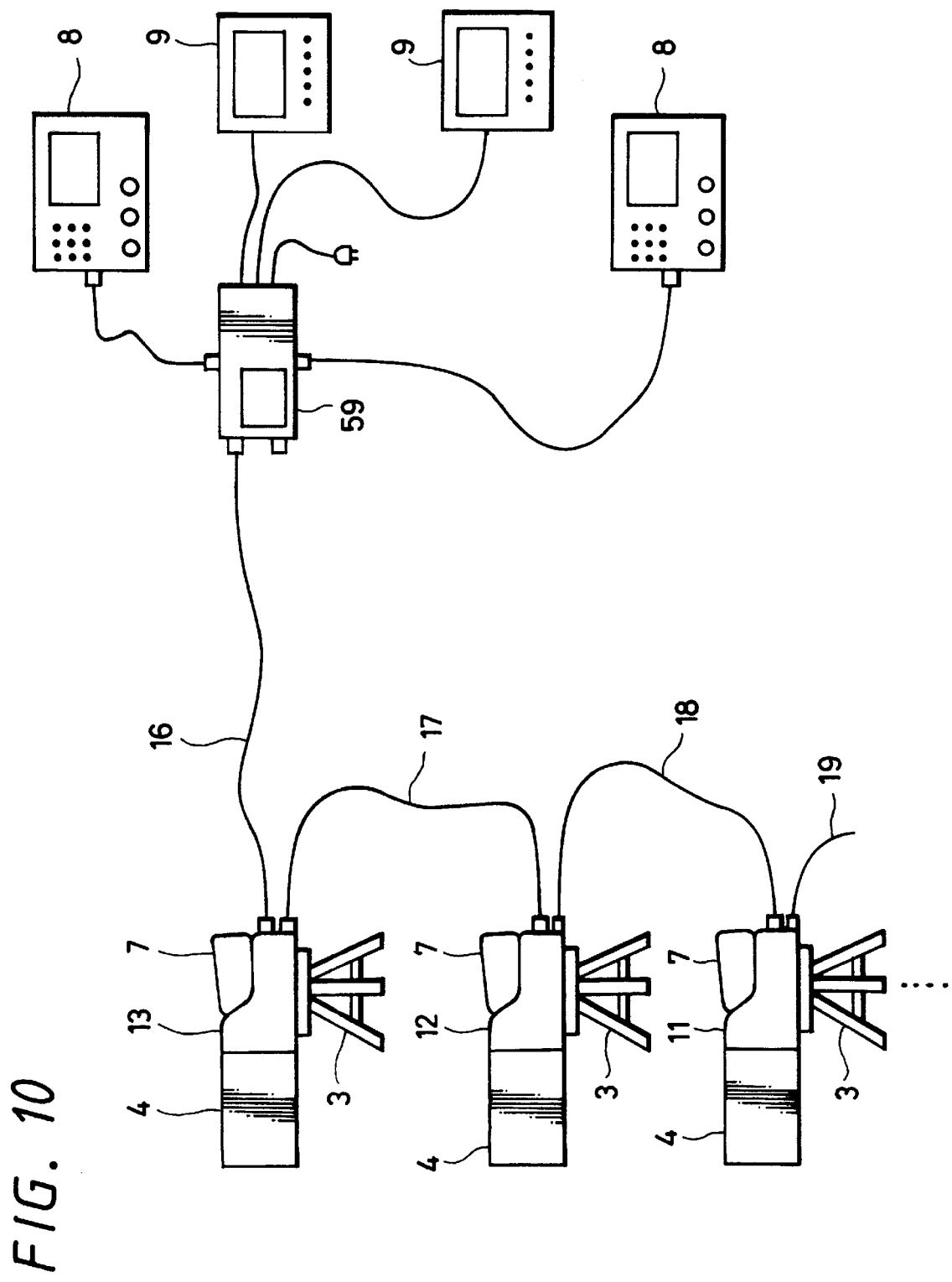
FIG. 10 is a schematic diagram showing a television camera system according to other embodiment.

(4) Other embodiment:

While the system comprises two camera head units and two camera control units as described above, the present invention is not limited thereto and may be widely applied to the cases in which the system comprises a plurality of camera head units and a plurality of camera control units as shown in FIG. 10. In these cases, the present invention may be applied to the case in which a camera control unit 59 having functions of a plurality of camera control units are connected to a plurality of camera head units 11, 12, 13.

Figure 11:
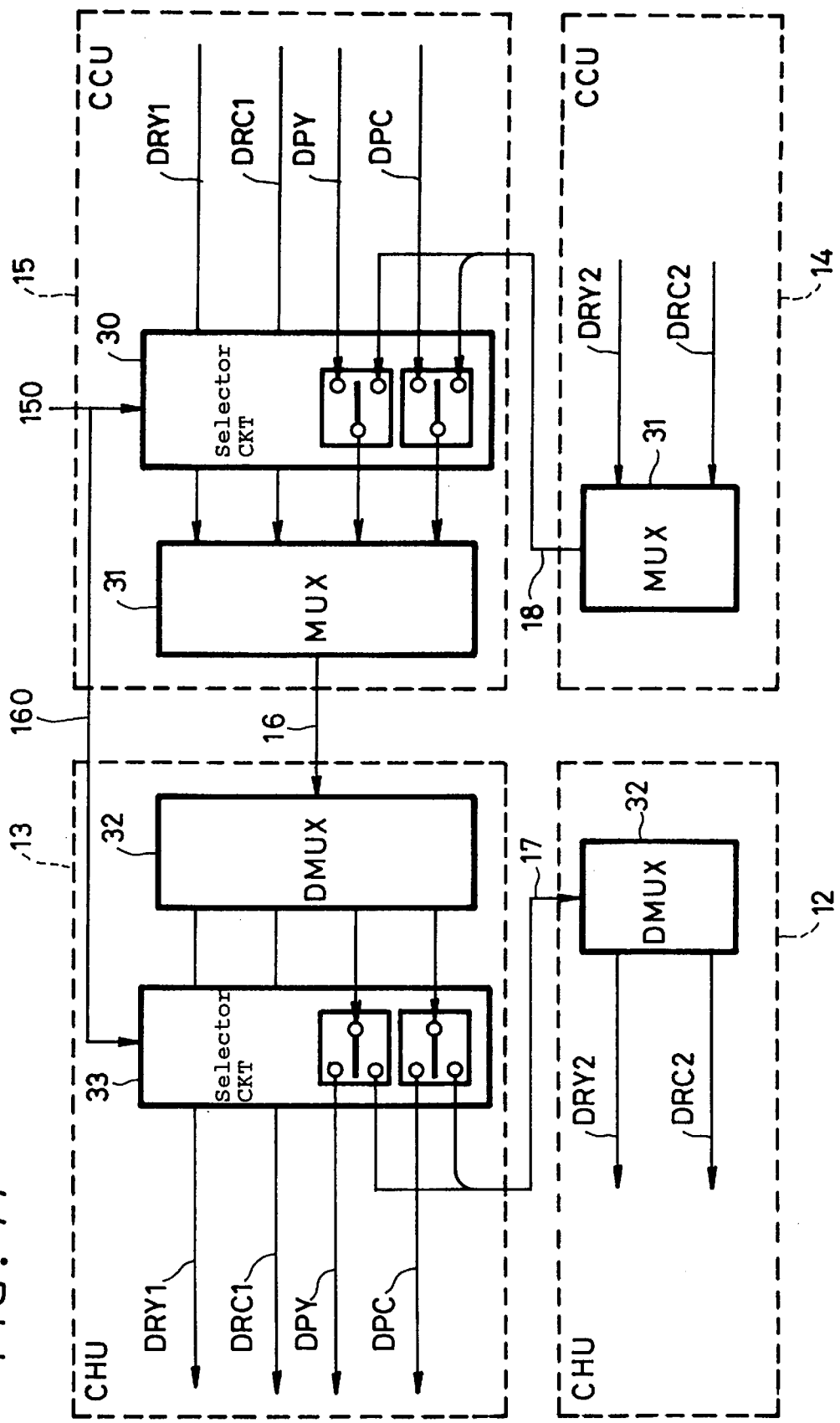
FIG. 11 is a block diagram showing a return system according to other embodiment.
Figure 12:
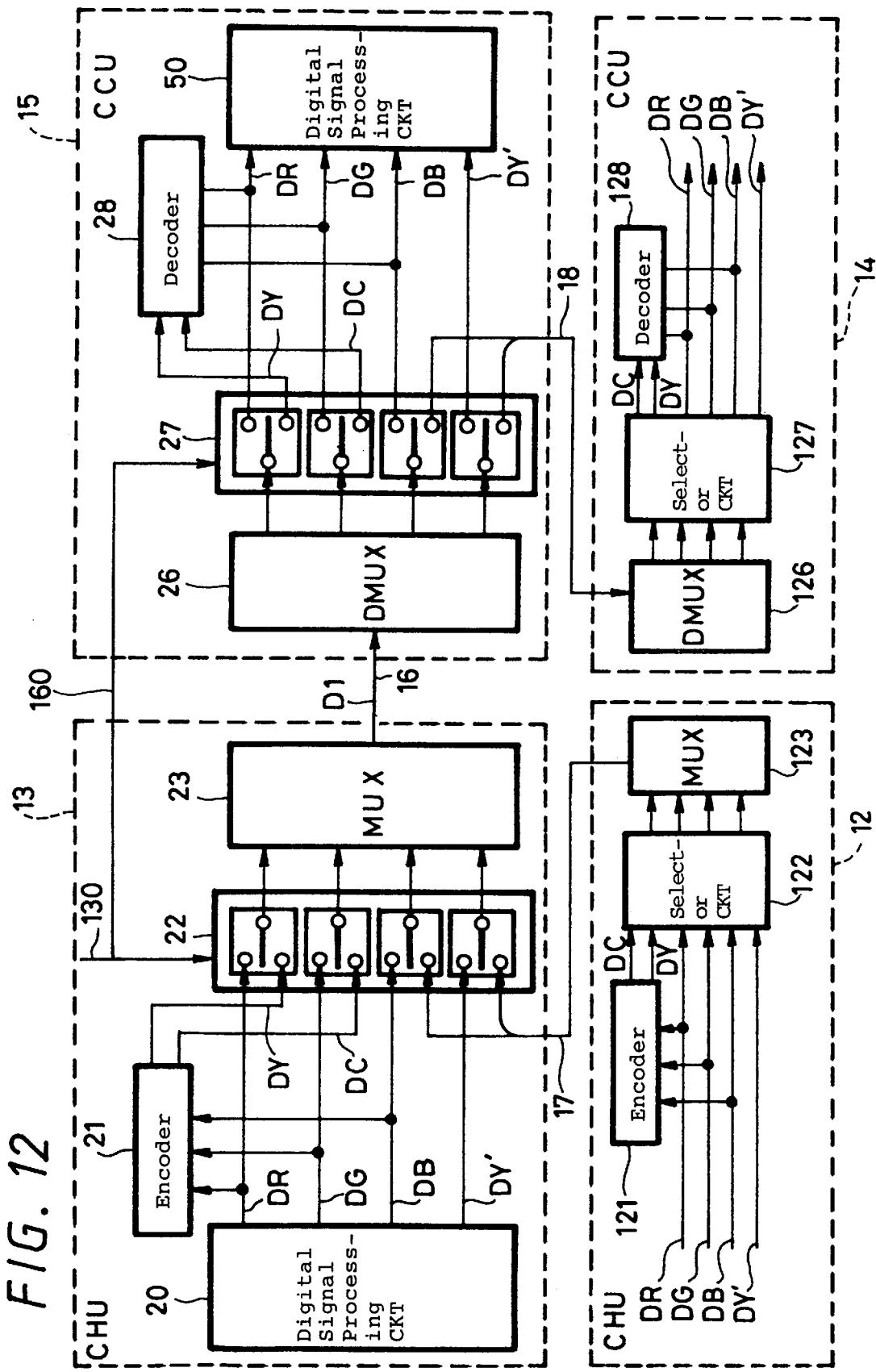
FIG. 12 is a block diagram showing a main-line system according to other embodiment.

Further, in the first embodiment, the control signals 130 and 150 for switching the switches of the selector circuits 22 and 27 are superimposed upon the signal transmitted through the optical-fiber cable 16 or interposed into the blanking period between the camera head unit 13 and the camera control unit 15. However, according to the present invention, as shown in FIGS. 12 and 11 (the main-line system and the return system), the control signal may be transmitted through a wire 160 which is a system different from the optical-fiber cable 16. Specifically, the switches of the selector circuits 27, 22 are not switched in response to the control signals 130, 150 from the external switches of the camera control unit 15 or the camera head unit 13, though not shown, and the control signals 130, 150 are not transmitted through the optical-fiber cable 16. However, these control signals may be transmitted through the wire 160 which is the system different from the optical-fiber cable 16 and the switches of the selector circuits 22, 27 of the camera control unit 13 or the camera control unit 15 provided at the other end may be switched in correspondence with the inputted digital signal.

Also in this case, similar effects that the first embodiment has achieved can be achieved.

While the shot video results are multiplexed at the bit unit according to the first embodiment, the present invention is not limited thereto and shot video results may be multiplexed with a data unit of predetermined length.

While the shot video results are frequency-multiplexed according to the second embodiment, the present invention is not limited thereto and shot video results may be time-division-multiplexed by timebase-compressing the shot video result at the unit of horizontal scanning period, for example.

Further, while the shot video result containing the luminance correction signal was converted into the 4:4:2 color difference format to thereby reduce the transmission band according to the first embodiment, the present invention is not limited thereto and may be widely applied to the case in which shot video result is converted into a video signal containing a luminance correction signal or a 4:2:2 color difference format or the case in which these formats are converted into a format standardized according to the MPEG.

While shot video result or the like is transmitted through the optical-fiber cable composed of a bundle of optical fibers of the main line and the return system according to the first embodiment, the present invention is not limited thereto and may be widely applied to the case in which shot video result is transmitted in two ways through a single optical fiber. Further, when an optical-fiber cable formed of a bundle of optical fibers of the main line and the return system is used, the respective main lines and the return systems may be used in two ways, e.g. the main-line system of the first camera head unit, for example, may be used as the return system of the second camera head unit.

As described above, according to the present invention, shot video result of external device also is transmitted through the cable through which shot video result is transmitted, and hence video signals of a plurality of network lines can be transmitted through the single cable. Thus, a work for laying cables for the image pickup apparatus can be simplified.

INDUSTRIAL APPLICABILITY

As described above, the image pickup apparatus according to the present invention is suitable for easily installing a plurality of television broadcasting camera head units in the studio or in the outdoors.

What is claimed is:

1. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that a first one of said image pickup apparatus includes a first selecting means for selectively outputting a first shot video result from said first image pickup apparatus and a second shot video result containing shot video results from at least one other image pickup apparatus connected to said first image pickup apparatus based on a control signal from one control apparatus of a plurality of control apparatus; and, wherein said control apparatus include a second selecting means supplied with said first or second shot video result which is a shot video result selectively outputted through said predetermined cable from said first image pickup apparatus, selecting said first shot video result and said second shot video result based on said control signal inserted into said first or second shot video result and outputting said second shot video result to another control apparatus connected when said second shot video result is selected.

2. A camera system as claimed in claim 1, wherein said predetermined cable is an optical-fiber cable.

3. A camera system as claimed in claim 1, wherein said image pickup apparatus include a multiplexing means for multiplexing said first shot video result or said second shot video result outputted from said first selecting means and a multiplexed shot video result is outputted from said image pickup apparatus.

4. A camera system as claimed in claim 1, wherein said first shot video result comprises video signals of red, green and blue color signals composed of digital signals, and data other than said video signals, and said second shot video result comprises a video signal comprising a luminance signal and a chroma signal composed of digital signals from said first image pickup apparatus and a video signal from said at least one other image pickup apparatus.

5. A camera system as claimed in claim 1, wherein said control apparatus include a separating means for separating inputted first or second shot video result thus multiplexed and outputting said thus separated shot video result to said second selecting means.

6. A camera system as claimed in claim 1, wherein said image pickup apparatus include a first converting means supplied with red, green and blue signals composed of digital signals of said first shot video result and outputting a digital luminance signal and a chroma signal composed of digital signals contained in said second shot video result.

7. A camera system as claimed in claim 1, wherein said control means includes a second converting means for demodulating said luminance signal and said chroma signal composed of digital signals contained in said second shot video result to provide red, green and blue digital color signals.

8. A camera system as claimed in claim 1, wherein said control signal for selectively controlling said first selecting means is transmitted to said image pickup apparatus through said predetermined cable from said control apparatus.

9. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that a first one of said image pickup apparatus includes an external switching means and a first selecting means for selectively outputting a first shot video result from said first image pickup apparatus and a second shot video result containing shot video results from at least one other image pickup apparatus connected to said first image pickup apparatus based on a control signal from one control apparatus of a plurality of control apparatus; and, wherein said control apparatus include a second selecting means supplied with said first or second shot video result which is a shot video result selectively outputted through said predetermined cable from said first image pickup apparatus, and selecting said first shot video result and said second shot video result based on said control signal inserted into said first or second shot video result and outputting said second shot video result to another control apparatus connected when said second shot video result is selected.

10. A camera system as claimed in claim 9, wherein said image pickup apparatus include a multiplexing means for multiplexing said first shot video result or said second shot video result outputted from said first selecting means and a multiplexed shot video result is outputted from said image pickup apparatus.

11. A camera system as claimed in claim 9, wherein said first shot video result comprises video signals of red, green and blue color signals composed of digital signals, and data other than said video signals, and said second shot video result comprises a video signal comprising a luminance signal and a chroma signal composed of digital signals from said first image pickup apparatus and a video signal from said at least one other image pickup apparatus.

12. A camera system as claimed in claim 9, wherein said control apparatus include a separating means for separating inputted first or second shot video result thus multiplexed and outputting said thus separated shot video result to said second selecting means.

13. A camera system as claimed in claim 9, wherein said image pickup apparatus include a first converting means supplied with red, green and blue signals composed of digital signals of said first shot video result and outputting a luminance signal and a chroma signal composed of digital signals contained in said second shot video result.

14. A camera system as claimed in claim 9, wherein said control apparatus includes a second converting means for demodulating said luminance signal and said chroma signal composed of digital signals contained in said second shot video result to provide red, green and blue digital color signals.

15. A camera system as claimed in claim 9, wherein said predetermined cable is an optical-fiber cable.

16. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that a first one of said image pickup apparatus includes an external switching means and a first selecting means for selectively outputting a first shot video result from said first image pickup apparatus and a second shot video result containing shot video results from at least one other image pickup apparatus connected to said first image pickup apparatus based on a control signal from one control apparatus of a plurality of control apparatus and in which said control apparatus are connected to said external switching means through a cable of a system different from said predetermined cable and include a second selecting means supplied with said first or second shot video result which is a shot video result selectively outputted through said predetermined cable from said first image pickup apparatus, selecting said first shot video result and said second shot video result based on said control signal outputted from said external switching means through said cable of said different system and outputting said second shot video result to another control apparatus connected to said control apparatus when said second shot video result is selected.

17. A camera system as claimed in claim 16, wherein said predetermined cable is an optical-fiber cable and said cable of said system different from that of said predetermined cable is a wire cable.

18. A camera system as claimed in claim 16, wherein said image pickup apparatus include a multiplexing means for multiplexing said first shot video result or said second shot video result outputted from said first selecting means and a multiplexed shot video result is outputted from said image pickup apparatus.

19. A camera system as claimed in claim 16, wherein said first shot video result comprises video signals of red, green and blue color signals composed of digital signals, and data other than said video signals, and said second shot video result comprises a video signal comprising a luminance signal and a chroma signal composed of digital signals from said first image pickup apparatus and a video signal from said at least one other image pickup apparatus.

20. A camera system as claimed in claim 16, wherein said control apparatus include a separating means for separating inputted first or second shot video result thus multiplexed and outputting said thus separated shot video result to said second selecting means.

21. A camera system as claimed in claim 16, wherein said image pickup apparatus include a first converting means supplied with red, green and blue signals composed of digital signals of said first shot video result and outputting a luminance signal and a chroma signal composed of digital signals contained in said second shot video result.

22. A camera system as claimed in claim 16, wherein said control apparatus includes a second converting means for demodulating said luminance signal and said chroma signal composed of digital signals contained in said second shot video result to provide red, green and blue digital color signals.

23. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that said control apparatus include a first selecting means supplied with a first video signal containing a video signal for retransmitting said video signal shot by said image pickup apparatus to said image pickup apparatus and a second video signal containing video signals from another control apparatus and selectively outputting said first video signal or said second video signal based on an externally supplied control signal, and said image pickup apparatus include a second selecting means supplied with said first or second shot video result which is a shot video result selectively outputted through said predetermined cable from one image pickup apparatus of a plurality of image pickup apparatus, selecting said first shot video result and said second shot video result based on said control signal inserted into said first or second shot video result and outputting said second shot video result to other control apparatus connected when said second shot video result is selected.

24. A camera system as claimed in claim 23, wherein said first video signal is a video signal used to re-transmit a video signal shot by said image pickup apparatus to said image pickup apparatus and a video signal for prompter.

25. A camera system as claimed in claim 23, wherein said video signal used to re-transmit said video signal shot by said image pickup apparatus to said image pickup apparatus is outputted when said first selecting means selectively outputs either of said first video signal and said second video signal.

26. A camera system as claimed in claim 23, wherein said video signal used to re-transmit said video signal shot by said image pickup apparatus to said image pickup apparatus is outputted when said second selecting means selectively outputs either of said first video signal and said second video signal.

27. A camera system as claimed in claim 23, wherein said predetermined cable is an optical-fiber cable.

28. A camera system as claimed in claim 23, wherein said control apparatus include a multiplexing means for multiplexing said first shot video result or said second shot video result outputted from said first selecting means and a multiplexed shot video result is outputted from said control apparatus.

29. A camera system as claimed in claim 23, wherein said image pickup apparatus include a separating means for separating said inputted and multiplexed first or second video signal and outputting separated first or second video signal to said second selecting means.

30. A camera system as claimed in claim 23, wherein said image pickup apparatus include a digital signal processing means and a display means wherein when said first video signal is selected and outputted from said second selecting means, said first video signal is inputted to said digital signal processing means and said video signal thus processed by said digital signal processing means is displayed on said display means and when said second video signal is outputted from said second selecting means, said second video signal is outputted to other image pickup apparatus connected to each other.

31. A camera system as claimed in claim 30, wherein said display means is a viewfinder and a prompter disposed on said image pickup apparatus, a video signal, contained in said first video signal, used to re-transmit a video signal shot by said image pickup apparatus is inputted through said digital signal processing means to said viewfinder, and said first video signal other than said video signal inputted to said viewfinder is inputted through said digital signal processing circuit to said prompter.

32. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that said control apparatus include an external switching means and a first selecting means for selectively outputting a first shot video result from said image pickup apparatus and a second shot video result containing shot video results from at least one other image pickup apparatus based on a control signal form one control apparatus of a plurality of control apparatus; and, wherein said image pickup apparatus include a second selecting means supplied with said first or second shot video result which is a shot video result selectively outputted from one control apparatus of a plurality of control apparatus through said predetermined cable, selectively outputting said first shot video result or said second shot video result based on said control signal inserted into said first or second video signal, and outputting said second video signal to at least one other image pickup apparatus when said second video signal is selected.

33. A camera system as claimed in claim 32, wherein said first video signal is a video signal used to re-transmit a video signal shot by said image pickup apparatus to said image pickup apparatus and a video signal for prompter.

34. A camera system as claimed in claim 32, wherein said video signal used to re-transmit said video signal shot by said image pickup apparatus to said image pickup apparatus is outputted when said first selecting means selectively outputs either of said first video signal and said second video signal.

35. A camera system as claimed in claim 32, wherein said video signal used to re-transmit said video signal shot by said image pickup apparatus to said image pickup apparatus is outputted when said second selecting means selectively outputs either of said first video signal and said second video signal.

36. A camera system as claimed in claim 32, wherein said predetermined cable is an optical-fiber cable.

37. A camera system as claimed in claim 32, wherein said control apparatus include a multiplexing means for multiplexing said first shot video result or said second shot video result outputted from said first selecting means and a multiplexed shot video result is outputted from said control apparatus.

38. A camera system as claimed in claim 32, wherein said image pickup apparatus include a separating means for separating said inputted and multiplexed first or second video signal and outputting separated first or second video signal to said second selecting means.

39. A camera system as claimed in claim 32, wherein said image pickup apparatus include a digital signal processing means and a display means wherein when said first video signal is selected and outputted from said second selecting means, said first video signal is inputted to said digital signal processing means and said video signal thus processed by said digital signal processing means is displayed on said display means and when said second video signal is outputted from said second selecting means, said second video signal is outputted to other image pickup apparatus connected to each other.

40. A camera system as claimed in claim 39, wherein said display means is a viewfinder and a prompter disposed on said image pickup apparatus, a video signal, contained in said first video signal, used to re-transmit a video signal shot by said image pickup apparatus is inputted through said digital signal processing means to said viewfinder, and said first video signal other than said video signal inputted to said viewfinder is inputted through said digital signal processing circuit to said prompter.

41. In a camera system comprising a plurality of image pickup apparatus for taking a picture of a desired object and outputting a shot video result through a predetermined cable and a plurality of control apparatus for controlling said image pickup apparatus and wherein a plurality of image pickup apparatus are connected to each other and transmit shot video results to a plurality of control apparatus through said predetermined cable, said camera system characterized in that control apparatus include a first selecting means supplied with a video signal used to re-transmit a video signal shot by said image pickup apparatus to said image pickup apparatus and a second video signal containing video signals from at least one other control apparatus and selectively outputting said first video signal or said second video signal based on an externally supplied control signal, and, wherein said image pickup apparatus are connected through one cable of a system different from said predetermined cable and include a second selecting means supplied with said first or second video signal selectively outputted through said one predetermined cable from one control apparatus of a plurality of control apparatus, selectively outputting said first video signal or said second video signal based on a control signal transmitted through said cable of said different system and outputting said second video signal to other image pickup apparatus connected to said image pickup apparatus when said second video signal is selected.

42. A camera system as claimed in claim 41, wherein said first video signal is a video signal used to re-transmit a video signal shot by said image pickup apparatus to said image pickup apparatus and a video signal for prompter.

43. A camera system as claimed in claim 41, wherein said video signal used to re-transmit said video signal shot by said image pickup apparatus to said image pickup apparatus is outputted when said first selecting means selectively outputs either of said first video signal and said second video signal.

44. A camera system as claimed in claim 41, wherein said video signal used to re-transmit said video signal shot by said image pickup apparatus to said image pickup apparatus is outputted when said second selecting means selectively outputs either of said first video signal and said second video signal.

45. A camera system as claimed in claim 41, wherein said predetermined cable is an optical-fiber cable.

46. A camera system as claimed in claim 41, wherein said control apparatus include a multiplexing means for multiplexing said first video signal or said second video signal outputted from said first selecting means and a multiplexed video signal is outputted from said control apparatus.

47. A camera system as claimed in claim 41, wherein said image pickup apparatus include a separating means for separating said inputted and multiplexed first or second video signal and outputting separated first or second video signal to said second selecting means.

48. A camera system as claimed in claim 41, wherein said image pickup apparatus include a digital signal processing means and a display means wherein when said first video signal is selected and outputted from said second selecting means, said first video signal is inputted to said digital signal processing means and said video signal thus processed by said digital signal processing means is displayed on said display means and when said second video signal is outputted from said second selecting means, said second video signal is outputted to other image pickup apparatus connected to each other.

49. A camera system as claimed in claim 41, wherein said display means is a viewfinder and a prompter disposed on said image pickup apparatus, a video signal, contained in said first video signal, used to re-transmit a video signal shot by said image pickup apparatus is inputted through said digital signal processing means to said viewfinder, and said first video signal other than said video signal inputted to said viewfinder is inputted through said digital signal processing circuit to said prompter.

50. An image pickup apparatus for picking up an image of a desired object and outputting a shot video result through a predetermined cable, comprising:

an external switching means and a selecting means for selecting an inputted first shot video result from said image pickup apparatus and a second shot video result containing shot video results from at least one other image pickup device connected to said image pickup apparatus through a second cable, said selecting means selectively outputting said first and second video results through said one predetermined cable to an external device based on a control signal from said external switching means.

51. An image pickup apparatus as claimed in claim 50, wherein said predetermined cable is an optical-fiber cable.

52. An image pickup apparatus as claimed in claim 50, wherein said image pickup apparatus multiplexes said first shot video result or said second shot video result outputted from said selecting means and outputs said first or second multiplexed shot video result through said predetermined cable to said external device.

53. An image pickup apparatus as claimed in claim 50, wherein said image pickup apparatus includes a converting means supplied with red, green and blue color signals of digital signals of said first shot video result and outputting said luminance signal and said chroma signal composed of digital signals contained in said second shot video result.

54. An image pickup apparatus for picking up an image of a desired object and outputting a shot video result through a predetermined cable, comprising:

an external switching means and a selecting means for selecting an inputted first shot video result from said image pickup apparatus and a second shot video result containing shot video results from at least one other image pickup device connected to said image pickup apparatus, said selecting means outputting said first or second selected video result through said one predetermined cable to an external device based on a control signal from said external switching means; and wherein said first shot video result comprises video signals of red, green and blue color signals composed of digital signals, and data other than said video signals, and said second shot video result comprises a video signal comprising a luminance signal and a chroma signal composed of digital signals from said image pickup apparatus for outputting said first shot video result and a video signal from said at least one image pickup device.

* * * * *